United States Patent
Shin et al.

(10) Patent No.: US 8,355,764 B2
(45) Date of Patent: Jan. 15, 2013

(54) SLIDING MODULE FOR SLIDE-TYPE PORTABLE COMMUNICATION APPARATUS

(75) Inventors: Hyun-Suk Shin, Gyeongsangbuk-do (KR); Sung-Gwan Woo, Gyeongsangnam-do (KR); Ki-Taek Kim, Gyeonggi-do (KR); Hyon-Myong Song, Daegu (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 211 days.

(21) Appl. No.: 12/714,624

(22) Filed: Mar. 1, 2010

(65) Prior Publication Data
US 2010/0222117 A1  Sep. 2, 2010

(30) Foreign Application Priority Data
Mar. 2, 2009  (KR) .................... 10-2009-0017658

(51) Int. Cl.
*H04M 1/00* (2006.01)
*H05K 7/00* (2006.01)
*H05K 5/00* (2006.01)
*H05K 7/20* (2006.01)
*G06F 1/16* (2006.01)

(52) U.S. Cl. ............. 455/575.4; 455/575.1; 361/679.56; 361/679.01; 361/679.05

(58) Field of Classification Search .................. 455/566, 455/550.1, 575.1, 575.4, 90.3; 361/679.01, 361/679.05, 679.56; 360/96.51
See application file for complete search history.

(56) References Cited

U.S. PATENT DOCUMENTS
2009/0029749 A1*  1/2009  Lee .............................. 455/575.4
* cited by examiner

*Primary Examiner* — Jinsong Hu
*Assistant Examiner* — Opiribo Georgewill
(74) *Attorney, Agent, or Firm* — Cha & Reiter, LLC

(57) ABSTRACT

A sliding module for a slide-type portable communication apparatus including a main body and a sliding body which slides on the main body along a sliding distance provided from a start position to an end position. The sliding module includes a fixed plate engaged with the main body, a moving plate being engaged with the sliding body and sliding along the sliding distance. A sliding module is provided between the fixed plate and the moving plate and provides a dead point position between the start position and a center position of the sliding distance, or closer to the start position to slide the moving plate. The dead position prevents the accidental closing of the sliding body and loss of communication if a user's hand slips during the opening of the sliding body to expose a portion of the main body.

6 Claims, 8 Drawing Sheets

SLIDING MODULE FOR SLIDE-TYPE PORTABLE COMMUNICATION APPARATUS

CLAIM OF PRIORITY

This application claims the benefit of priority of a Korean Patent Application filed in the Korean Intellectual Property Office on Mar. 2, 2009 and assigned Serial No. 10-2009-0017658, the entire disclosure of which is hereby incorporated by reference in its entirety.

BACKGROUND OF THE INVENTION

1. Field of the Invention

The present invention relates to a sliding module for a slide-type portable communication apparatus. More particularly, the present invention relates to a module for opening and closing a slide-type portable communication apparatus.

2. Description of the Related Art

Generally, a portable communication apparatus refers to an electronic apparatus sufficiently small in size to be carried by a user to perform wireless communications with the other parties. Such portable communication apparatuses may include but are not limited to hand-held phones (HHPs), Cordless Telephone-2 (CT-2) cellular phones, digital phones, Personal Communications Service (PCS) phones, and Personal Digital Assistants (PDAs), and may be classified into many different types according to their appearance. For example, the portable communication apparatuses may be classified as bar-type, flip-type, folder-type, and slide-type portable communication apparatuses according to their appearance. Each of the conventional portable communication apparatuses is indispensably provided with an antenna unit, data input/output units, and data transmitting/receiving units. Usually, the data input unit includes a keypad with which a user can input data by key pressing with fingers. The conventional portable communication apparatus may have actual key buttons and/or a touchscreen. The data output unit would typically include a display screen and a speaker.

Referring to FIGS. 1 and 4, a conventional slide-type portable communication apparatus 1 typically includes a main body 2, a sliding body 3 that slides on/along the main body 2 relative to the main body, and a sliding module 4 that provides a sliding distance L1 from a start position A1 to an end position A2 to urge the sliding body 3 to slide the sliding distance L1 on the main body 2.

Referring now to FIGS. 1 to 4, the sliding module 4 in the conventional slide-type portable communication apparatus includes a fixed plate 2a engaged with the main body 2, a moving plate 3a that is engaged with the sliding body 3 and slides on the fixed plate 2a, and an elastic body 6 that is interposed between the fixed plate 2a and the moving plate 3a to provide an elastic force for enabling sliding of the moving plate 3a in a direction as shown in FIGS. 3 and 4.

The elastic body 6 may include, for example, a coil spring, a single-layer spring, and a push rod.

Referring now to FIGS. 3 and 4, the conventional elastic body 6 has the aforementioned elements to urge the moving plate 3a to slide the sliding distance L1. However, as regards the drawbacks of a structure connecting the moving plate 3a to the fixed plate 2a, the moving plate 3a may come to a stop in the center between the start position A1 and the end position A2 of sliding distance L1 at which the expanding force and the contracting force of the elastic body 6 become equal to each other, causing a dead point position 5.

That is, the sliding body 3, which has been sliding on the main body 2, may stop the sliding in the center of the sliding distance L1. If a user of the slide-type portable communication apparatus 1 with the sliding module 4 slightly slides the sliding body 3 to use the communication apparatus 1 in a communication mode, the sliding body 3 may fail to pass the dead point position 5 and move back to the start position A1 of the sliding distance L1. As a result, the sliding body 3 is closed, interrupting the communication mode.

If the expanding force or contracting force of the elastic body 6 is increased to change the dead point position 5, the rotation locus of the elastic body 6 also increases, causing interference with a Flexible Printed Circuit Board (FPCB) provided in the communication apparatus 1.

Therefore, there is a need for a device capable of allowing a sliding body to slide past a dead point position of the slide-type portable communication apparatus even with a slight movement by positioning the dead point between a start position and a center point of a sliding distance without increasing the rotation locus of the elastic body.

SUMMARY OF THE INVENTION

An exemplary aspect of the present invention is to provide a sliding module for a slide-type portable communication apparatus, which provides a dead point position between a start position and a center position of a sliding distance, thereby allowing a sliding body to slide even with a slight push so as to prevent an ongoing communication mode of the communication apparatus from being interrupted due to closing of the sliding body.

Another exemplary aspect of the present invention is to provide a sliding module for a slide-type portable communication apparatus, which places a dead point position close to a start position of a sliding distance and far away from an end position of the sliding distance such that a distance between the end position and the dead point position is relatively long when a user operates the communication apparatus, thereby preventing the user from accidentally closing the communication apparatus.

According to another exemplary aspect of the present invention, there is provided a sliding module for a slide-type portable communication apparatus including a main body and a sliding body that slides on the main body along a sliding distance provided from a start position to an end position. The sliding module includes a fixed plate engaged with the main body, a moving plate being engaged with the sliding body and sliding along the sliding distance, and a module being provided between the fixed plate and the moving plate and providing a dead point position between the start position and a center position of the sliding distance, or closer to the start position to slide the moving plate.

BRIEF DESCRIPTION OF THE DRAWINGS

The above and other features and advantages of an exemplary embodiment of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION

Figure 1:
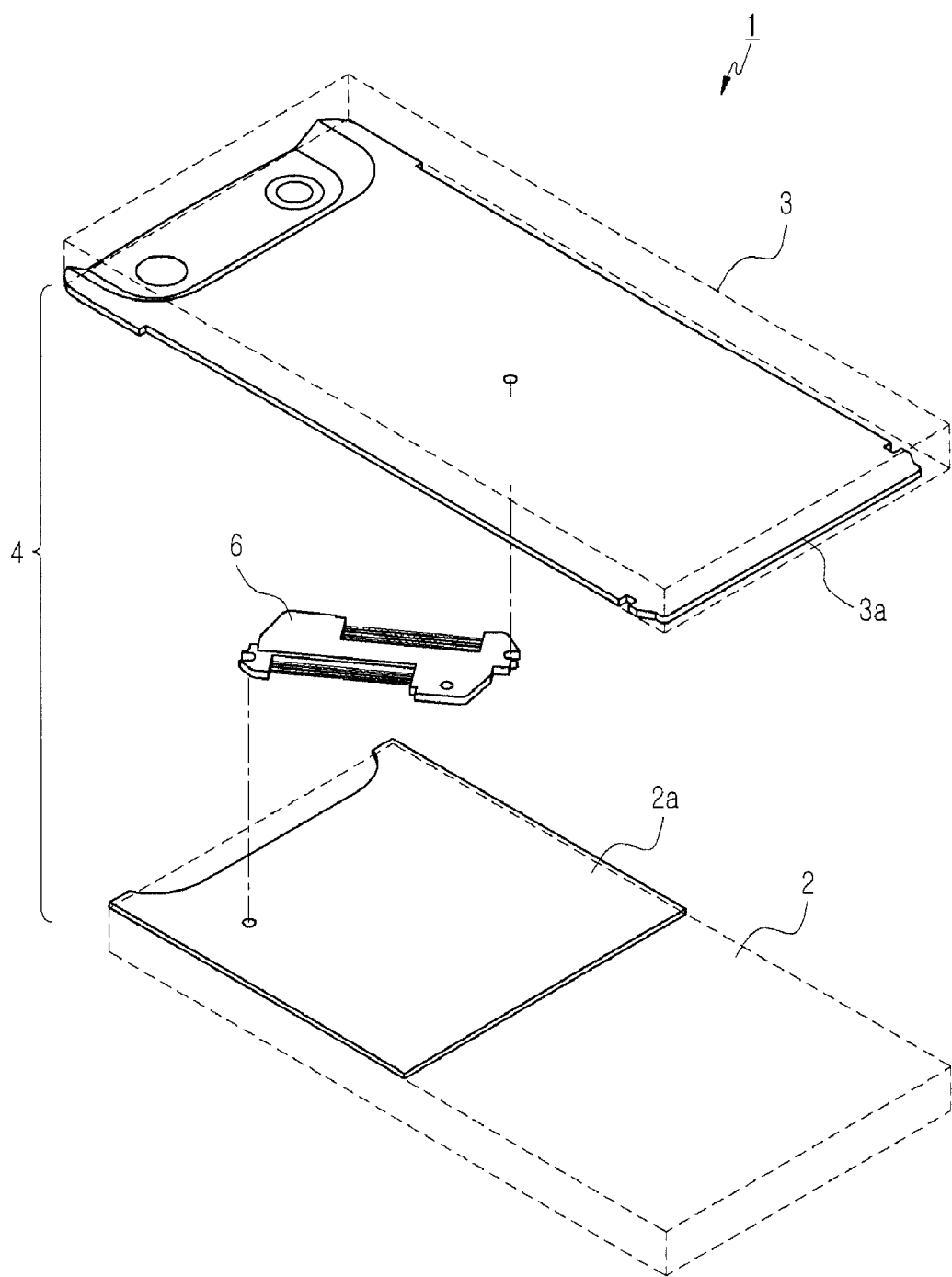
FIG. 1 is an exploded perspective view showing a structure of a sliding module for a conventional slide-type portable communication apparatus.
Figure 2:
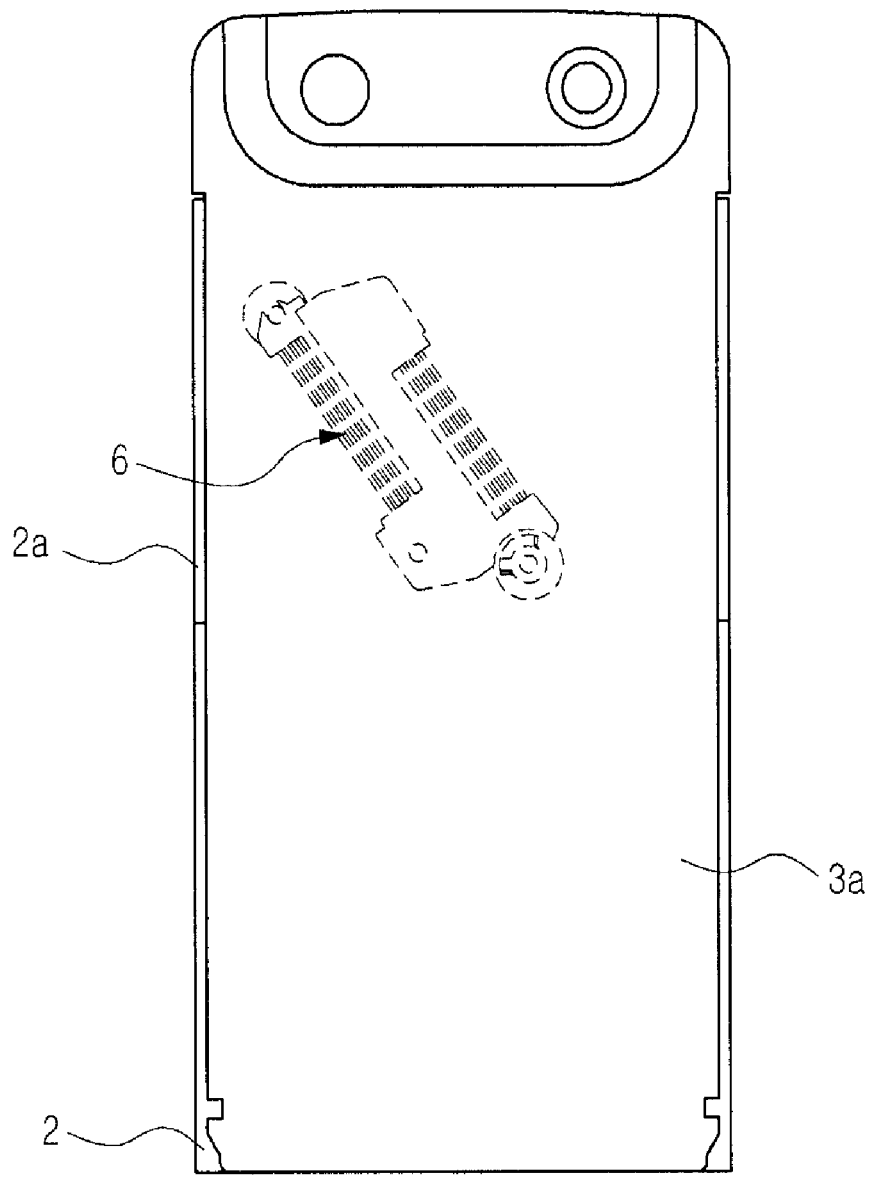
FIG. 2 is a front view showing a start state before the sliding module slides in the conventional slide-type portable communication apparatus slides.
Figure 3:
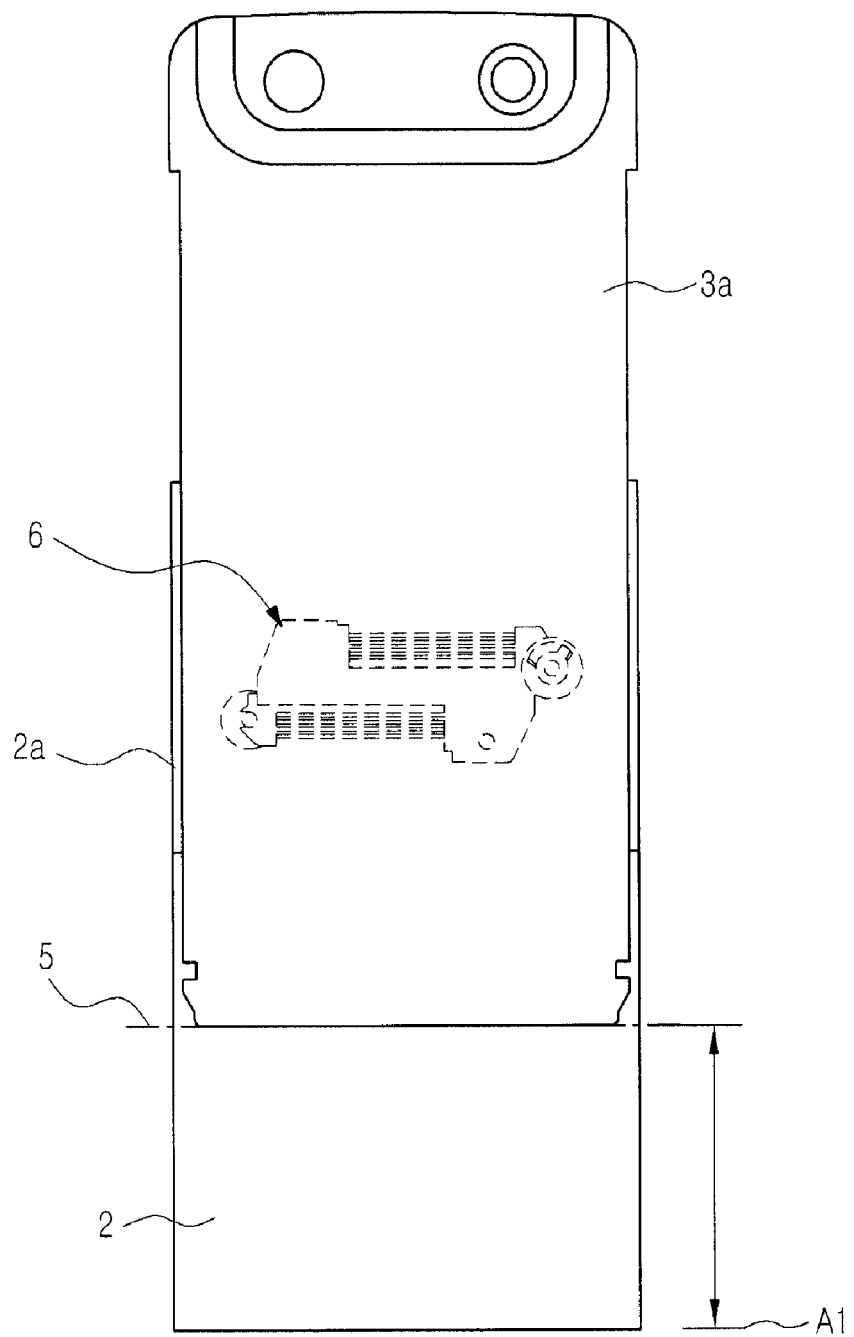
FIG. 3 is a front view showing a state in which a sliding body stops sliding at a dead point when the sliding module slides in the conventional slide-type portable communication apparatus slides.
Figure 4:
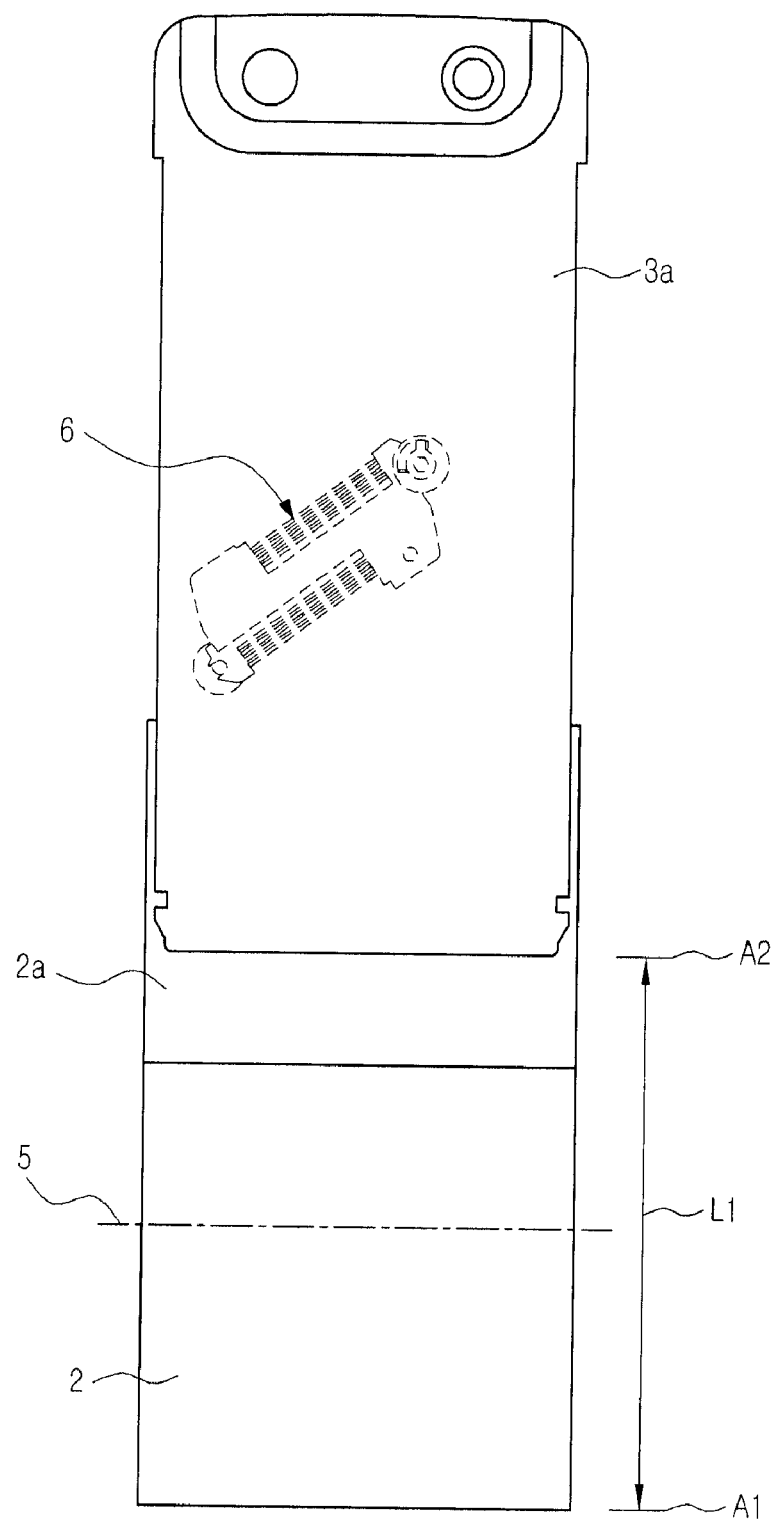
FIG. 4 is a front view showing an end state after the sliding module slides in the conventional slide-type portable communication apparatus.

Hereinafter, an exemplary embodiment of the present invention will be described in detail with reference to the accompanying drawings. Prior to a description, it should be understood that the embodiment described below and structures shown in the drawings correspond to the preferred embodiment of the present invention rather than entirely represent the technical spirit of the present invention, so there may be various changes and modifications capable of substituting for them at the time of filing.

Figure 6:
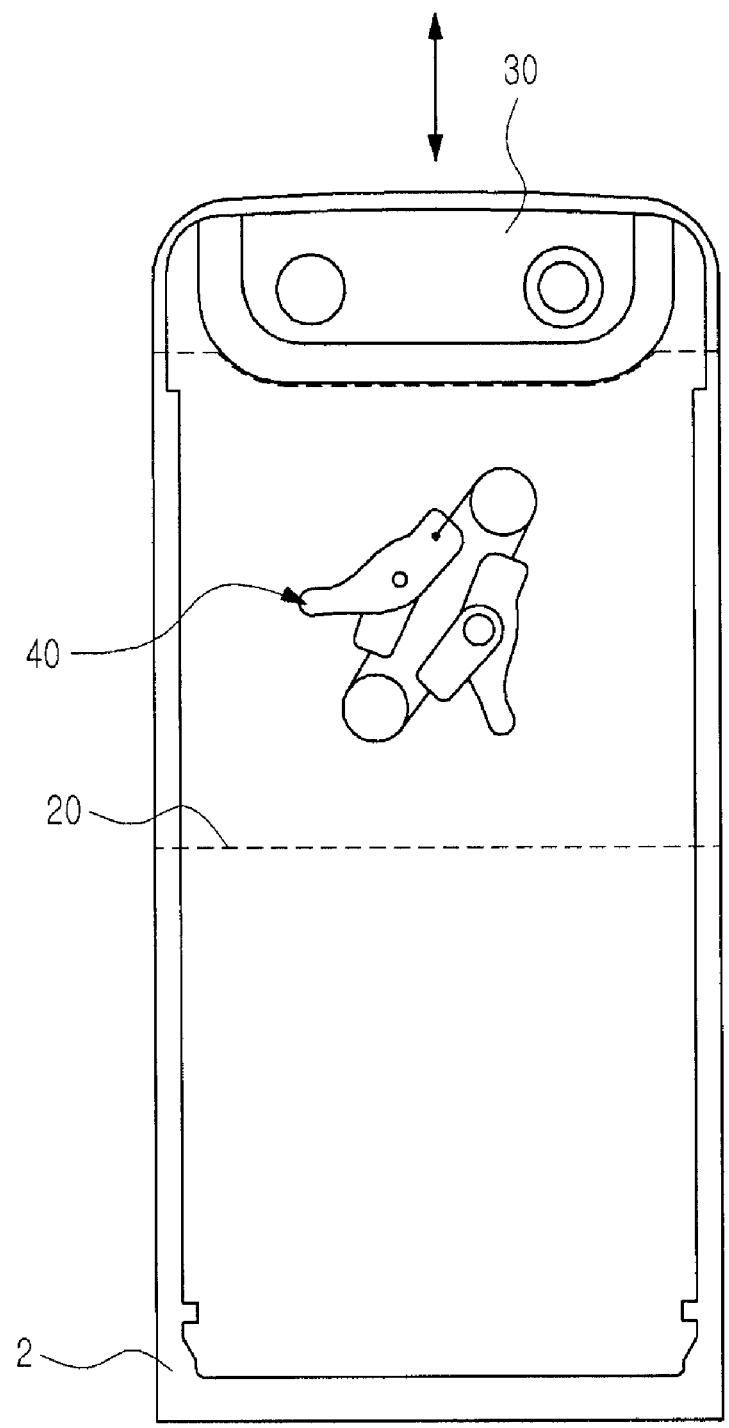
FIG. 6 is a front view showing a start state before the sliding module slides in the slide-type portable communication apparatus according to an exemplary embodiment of the present invention.
Figure 7:
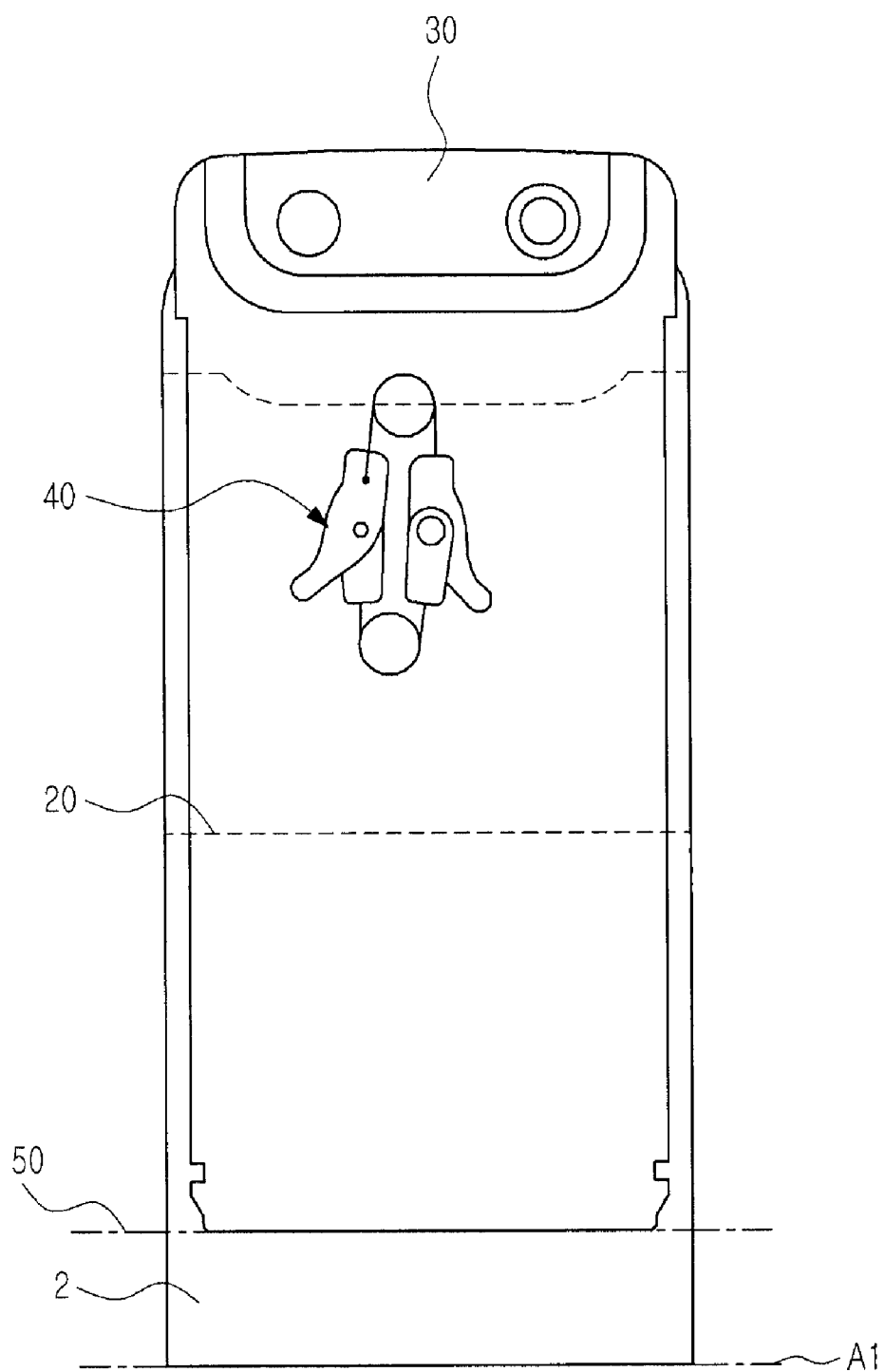
FIG. 7 is a front view showing a state in which a sliding body stops sliding at a dead point position provided closer to a start position than the end position when the sliding module slides in the slide-type portable communication apparatus according to an exemplary embodiment of the present invention.
Figure 8:
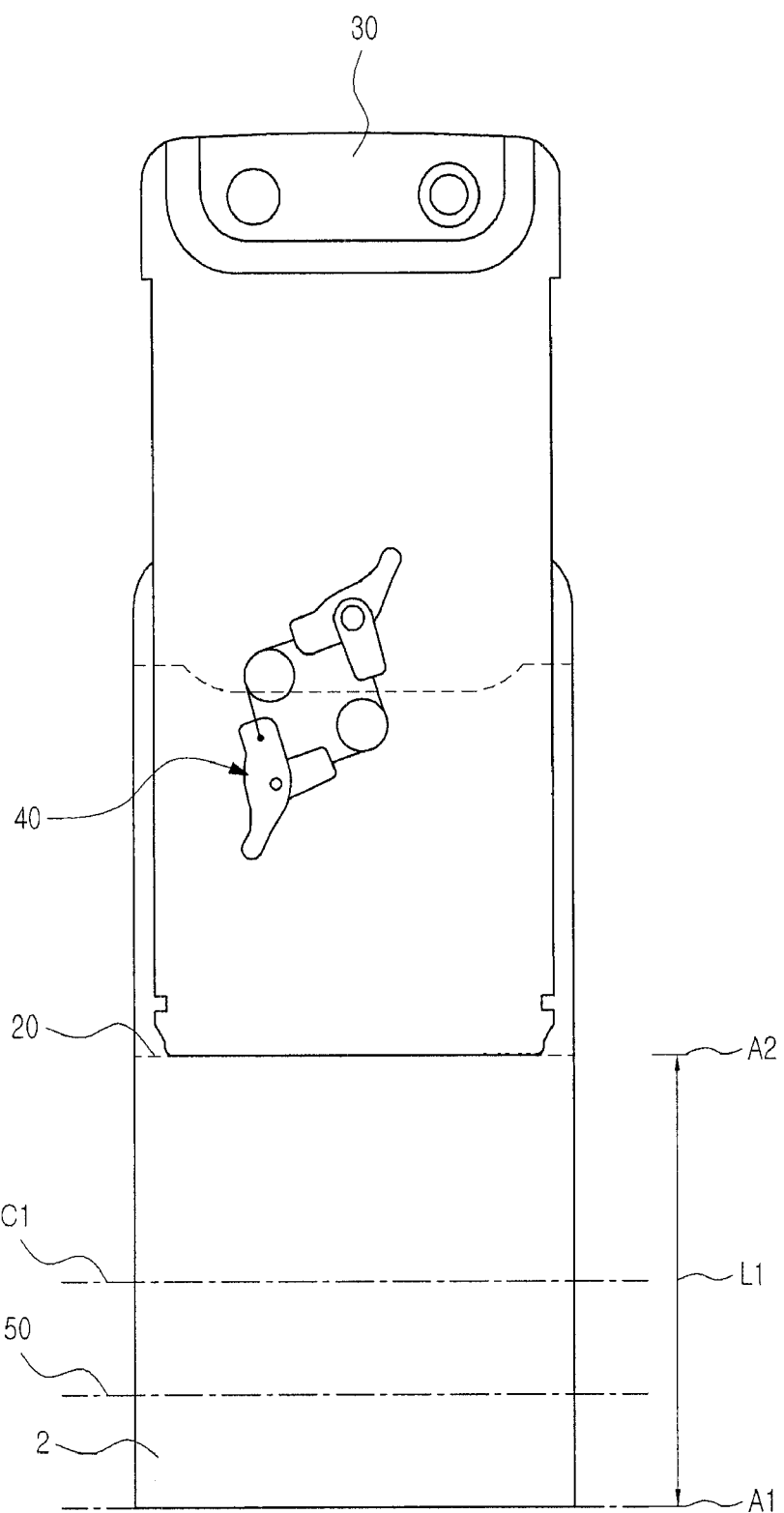
FIG. 8 is a front view showing an end state after the sliding module slides in the slide-type portable communication apparatus according to an exemplary embodiment of the present invention.

Referring now to FIGS. 5 to 8, a sliding module 10 for a slide-type portable communication apparatus 1 includes a main body 2, a sliding body 3, a fixed plate 20, a moving plate 30, and a rotatable coupling module 40. The main body 2 faces the sliding body 3 to urge the sliding body 3 to slide along sliding distance L1 (shown in FIG. 8). The sliding body 3 faces a top face of the main body 2 to slide on the main body 2 along the sliding distance L1 provided from a start position A1 to an end position A2 (FIG. 8). The fixed plate 20 faces the moving plate 30 and is engaged with the main body 2 to urge the moving plate 30 to slide the sliding distance L1. The moving plate 30 is engaged with the sliding body 3 and faces the fixed plate 20 to slide along the provided sliding distance L1. The rotatable coupling module 40 is provided between the fixed plate 20 and the moving plate 30 to urge the moving plate 30 to slide by providing a dead point position 50 (FIG. 8) between the start position A1 and a center position C1 of the sliding distance L1 or close to the start position A1.

FIG. 8 shows the dead point position 50 is provided closer to the start position A1 than the end position A2 such that a sliding distance between the end position A2 and the dead point position 50 is long and a sliding distance between the start position A1 and the dead point position 50 is relatively short as compared with the distance from the dead point position to the end position A2.

The rotatable coupling module 40 preferably includes an elastic body, which may include a coil spring, a torsion spring, a wire spring, a single-layer spring, a push rod, or other elastic bodies having an elastic force.

Referring again to FIGS. 5 to 8, the rotatable coupling module 40 includes first and second rotation coupling portions 41 and 42, first and second sliding rotation portions 43 and 44, and first and second elastic members 45 and 46. The first rotation coupling portion 41 is rotatably coupled to the fixed plate 20 so that it can support the second rotation coupling portion 42 such to provide rotation and elastic force of the second rotation coupling portion 42. The second rotation coupling portion 42 is rotatably coupled to the moving plate 30 to provide an elastic force by slidably rotating the moving plate 30. The first and second sliding rotation portions 43 and 44 are rotatably coupled to the first and second rotation coupling portions 41 and 42 to provide an elastic force by rotating together with the sliding of the moving plate 30. The first and second elastic members 45 and 46 are engaged with the first and second rotation coupling portions 41 and 42 and the first and second sliding rotation portions 43 and 44 to provide an elastic force for rotating the first and second sliding rotation portions 43 and 44 and to urge the sliding of the moving plate 30 with the elastic force.

Figure 5:
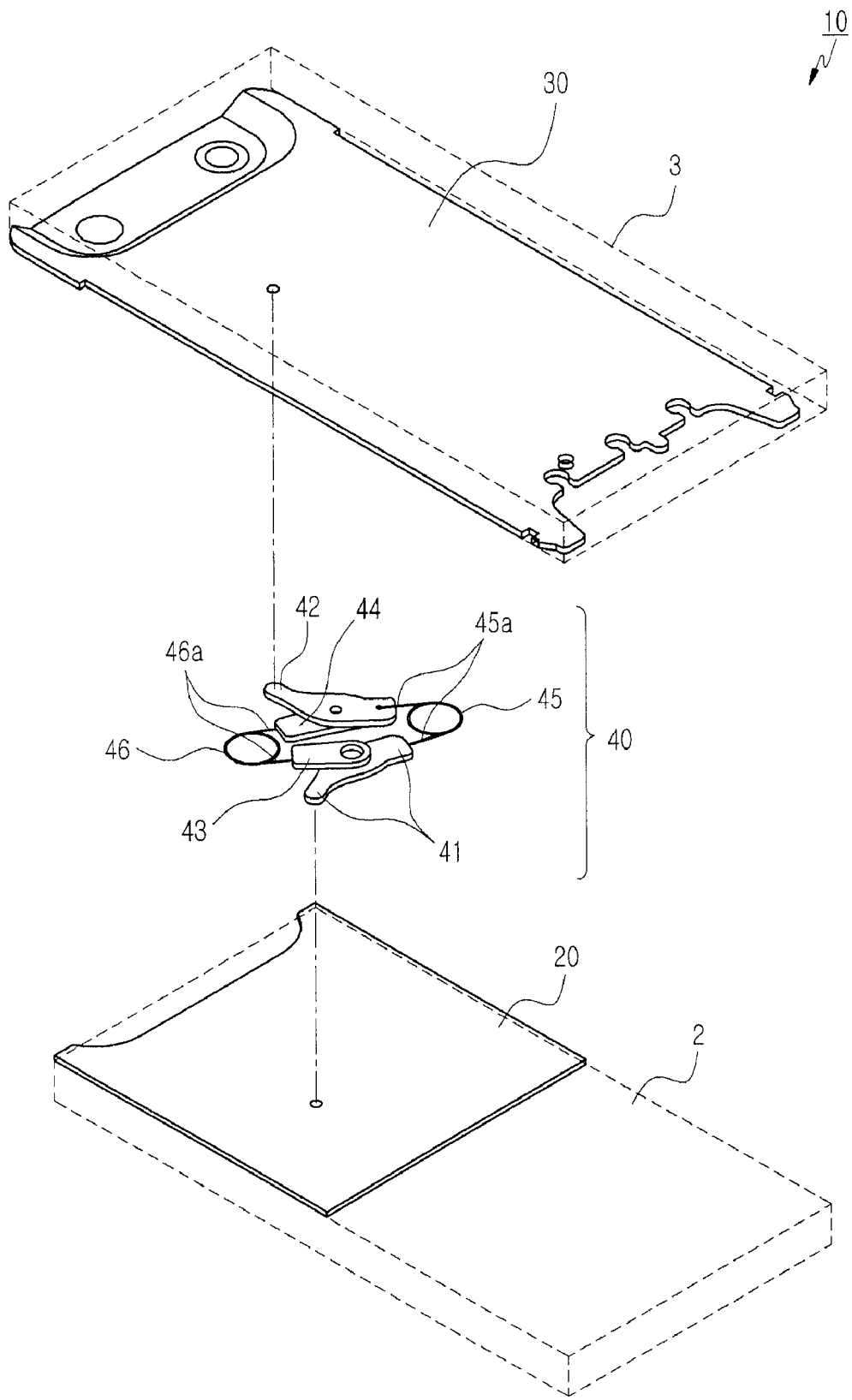
FIG. 5 is an exploded perspective view showing a structure of a sliding module for a slide-type portable communication apparatus according to an exemplary embodiment of the present invention.

With continued reference to FIG. 5, both ends 45a of the first elastic member 45 are engaged with the first and second rotation coupling portions 41 and 42 such that they can support the first and second rotation coupling portions 41 and 42 in such a way to provide an elastic force to the moving plate 30, and both ends 46a of the second elastic member 46 are engaged with the first and second sliding rotation portions 43 and 44 to slide the moving plate 30 with an elastic force provided by means of sliding rotation during rotation of the first and second rotation coupling portions 41 and 42.

The first and second elastic members 45 and 46 preferably include wire springs.

In conjunction with FIGS. 5 to 8, a more detailed description will now be made of an operation of the above-structured sliding module 10 for the slide-type portable communication apparatus 1 according to an exemplary embodiment of the present invention.

FIGS. 5 to 8 show the sliding module 10 for the slide-type portable communication apparatus 1 includes the main body 2, the sliding body 3, the fixed plate 20, the moving plate 30, and the rotatable coupling module 40. The rotatable coupling module 40 includes the first and second rotation coupling portions 41 and 42, the first and second sliding rotation portions 43 and 44, and the first and second elastic members 45 and 46.

As shown in FIG. 5, the first rotation coupling portion 41 is rotatably coupled to the fixed plate 20, the second rotation coupling portion 42 is rotatably coupled to the moving plate 30, and the first and second sliding rotation portions 43 and 44 are rotatably coupled to the first and second rotation coupling portions 41 and 42. As can be seen, both ends 45a of the first elastic member 45 are engaged with the first and second rotation coupling portions 41 and 42 and both ends 46a of the second elastic member 46 are engaged with the first and second sliding rotation portions 43 and 44.

Moreover, as shown in FIGS. 6 to 8, if a user slides the sliding body 3 from the start position A1 on the main body 2 towards the end position A2, the moving plate 30 also slides, reaches, and then passes the dead point position 50 provided between the start position A1 and the center position C1 of the sliding distance L1. The moving plate 30 can slide up to the end position A2 of the sliding distance L1. The moving plate 30 and the sliding body 3 slide together.

Still referring to FIG. 8, the dead point position 50 is provided closer to the start position A1 of the sliding distance L1 than to the end position A2, so that if the sliding body 3 is slightly pushed for sliding, it immediately reaches and then passes the dead point position 50, thereby facilitating the sliding of the sliding body 3.

Referring to FIGS. 6 to 8, if the user opens the sliding body by pushing the sliding body 3 to an open position with a small force, the sliding body 3 immediately passes the dead point position 50, thus exposing a top face of the main body 2.

Accordingly, even when the user accidentally lets go of the sliding body 3 from his hand during the sliding of the sliding body 3, it is possible to prevent the sliding body 3 from closing and thus preventing interruption of the communication mode (e.g. disconnect the telephone call, etc.).

Referring to FIG. 8, if the user accidentally moves the sliding body 3 to a closed position (that the user opened by sliding it), when using the slide-type portable communication apparatus 1 in the communication mode, the sliding body 3 is not likely to be closed due to the relatively long distance between the end position A2 of the sliding distance L1 and the dead point position 50 (as compared with the distance between start position A1 and dead point position 50).

As such, the user can easily open the sliding body 3 by pushing the sliding body 3 with a small force due to a short distance between the start position A1 of the sliding distance L1 and the dead point position 50 that is provided between the start position A1 and the center position C1. According to this exemplary aspect of the present invention, even when the user accidentally moves the sliding body 3 in the communication mode, it is possible to prevent the sliding body 3 from being easily closed due to the relatively long distance between the end position A2 of the sliding distance L1 and the dead point position 50.

While the sliding module for the slide-type portable communication apparatus according to the present invention has been shown and described with reference to an exemplary embodiment thereof, it will be understood by those skilled in the art that various substitutions, modifications, and changes in form and details may be made therein without departing from the spirit and scope of the invention as defined by the appended claims.

What is claimed is:

1. A sliding module for a slide-type portable communication apparatus, the sliding module comprising:
   a fixed plate engaged with the main body;
   a moving plate being engaged with the sliding body and sliding along the sliding distance; and
   a rotatable coupling module provided between the fixed plate and the moving plate and providing a dead point position between the start position and a center position of the sliding distance to slide the moving plate and open the portable communication apparatus,
   wherein the rotatable coupling module comprising first and second elastic members being engaged with (i) first and second rotation coupling portions of the fixed plate and the moving plate and (ii) first and second sliding rotation portions, respectively, to provide an elastic force for rotating the first and second sliding rotation portions and to slide the moving plate with the elastic force,
   wherein both ends of the first elastic member are engaged with the first and second rotation coupling portions, and both ends of the second elastic member are engaged with the first and second sliding rotation portions.

2. The sliding module of claim 1, wherein the dead point position is provided closer to the start position than the end position such that a sliding distance between the end position and the dead point position is longer and a sliding distance between the start position and the dead point position is shorter.

3. The sliding module of claim 1, wherein the rotatable coupling module includes an elastic body that comprises at least one of coil spring, a torsion spring, a wire spring, a single-layer spring, and a push rod.

4. The sliding module of claim 1, wherein the first and second elastic members comprise wire springs.

5. The sliding module of claim 1, wherein the rotatable coupling module providing an elastic force sufficient to urge the sliding of the moving plate past the dead point position.

6. The sliding module of claim 1, wherein the first sliding rotation portion is rotatably coupled onto an upper surface of the first rotation coupling portion, and the second sliding rotation portion is rotatably coupled onto a lower surface of the second rotation coupling portion.

* * * * *